United States Patent [19]
Kline et al.

[11] Patent Number: 5,127,434
[45] Date of Patent: Jul. 7, 1992

[54] CONTROL MODULE HAVING MULTIPLE SOLENOID ACTUATED VALVES

[75] Inventors: Loren H. Kline, Oregon, Ohio; Harry A. Sherwin; Robert J. Telep, both of Warren, Mich.

[73] Assignee: Coltec Industries Inc., New York, N.Y.

[21] Appl. No.: 645,248

[22] Filed: Jan. 24, 1991

Related U.S. Application Data

[60] Division of Ser. No. 503,396, Apr. 2, 1990, Pat. No. 5,009,250, which is a continuation-in-part of Ser. No. 324,766, Mar. 17, 1989, Pat. No. 4,913,189.

[51] Int. Cl.$^5$ .............................................. F16K 31/02
[52] U.S. Cl. ........................... 137/596.17; 251/129.21
[58] Field of Search .................... 251/129.21; 137/560, 137/561 R, 596.17, 884

Primary Examiner—John C. Fox
Attorney, Agent, or Firm—Howard S. Reiter

[57] ABSTRACT

Various forms of control modules incorporating multiple solenoid actuated valves and passages are disclosed. All disclosed modules include a one piece sheet metal mounting bracket upon which the multiple valves and manifold may be assembled in a frictional snap fit assembly procedure. The one piece sheet metal mounting bracket is formed with a pair of spaced parallel vertical webs, at least one web being formed with a double thickness of the sheet metal material and provided with U-shaped recesses extending into the web from its upper edge. The U-shaped recesses are adapted to snugly receive a portion of each valve housing which is formed with a pair of spaced radially outwardly projecting flanges which frictionally grip the opposed sides of the doubled web to hold the valve assemblies in a seated position. The other web engages the rearward ends of each valve assembly. Several variant assembly techniques are disclosed. In some cases, self-contained solenoid valve assemblies are assembled in plug-in fashion to a one-piece manifold and held in assembled relationship to the manifold by the webs of the sheet metal bracket. In other forms, a one-piece manifold incorporates portions of the individual assemblies, with solenoid coil sub-assemblies being slipped onto stems integrally formed on the manifold. In other forms, the solenoid coils are fly wound directly on stems integrally formed with the manifold within which the operating elements of the valve assemblies are mounted. In all cases, the metal bracket functions as a mounting bracket to mount the valve-manifold module on a support surface and also functions as a common low reluctance flux return path for the magnetic circuits of all solenoids.

12 Claims, 10 Drawing Sheets

CONTROL MODULE HAVING MULTIPLE SOLENOID ACTUATED VALVES

REFERENCE TO RELATED APPLICATION

This application is a division of application Ser. No. 07/503,396, filed Apr. 2, 1990, U.S. Pat. No. 5,001,250, which is a continuation-in-part of a commonly owned copending application Ser. No. 07/324,766, filed Mar. 17, 1989 U.S. Pat. No. 4,913,189.

BACKGROUND OF THE INVENTION

The present invention is directed to control modules which include a plurality of solenoid actuated valves which are intended for use in applications where the system which the module controls is produced in relatively large numbers on a mass production basis. Such applications are typically, but not exclusively, found in the automotive industry and in the parent application referred to above, such a module is disclosed as being employed to control the various vacuum motor actuated flow directing doors of the ducting system of an automotive heating/ventilating/air conditioning system.

In the design of such a module, the ultimate objective is to package all of the individual components into a single unit which can, on the assembly line, be installed by simply moving the unit to its assembled position in a one step operation. In the automotive climate control module described in the parent application referred to above, the completed control module takes the form of a rectangular box having connector nipples and electrical terminals exposed at one end of the box which, when the box is inserted into a receiving opening in the dashboard of the automobile, mate with electrical and vacuum hose connnections which had been previously installed on the vehicle.

In that control modules of the type with which the present invention is concerned are designed to be installed or assembled to the system which they are to control on a mass production basis, it necessarily follows that the modules themselves must be produced in large numbers and that the cost and ease of assembly of the modules is a matter of prime concern. Where possible, it is desirable that the individual component parts of the module be designed in a manner such that automated assembly techniques can be employed in assembly of the module and that a minimum number of individual parts be employed.

The present invention is directed to control modules which include a plurality of solenoid actuated valves in which the valves may be easily assembled into a single compact module in a mechanically secure assembly requiring a minimum number of seals in the internal fluid pressure connections within the module and to which the necessary external fluid pressure and electrical connections may be made as the module is assembled to the system which it is to control by a plug-in type assembly.

SUMMARY OF THE INVENTION

The present inventionn is directed to a control module in which a group of solenoid valve assemblies and a manifold having flow passages and external fluid system connections controlled by the valves are assembled upon a mounting bracket. While several forms of the invention are disclosed; all include a one piece sheet metal mounting bracket which retains the valve assemblies and manifold in assembled relationship to each other and to the bracket, provides a means for fixedly mounting the module to some other structure, and also provides an external magnetic flux return path for the valve actuating solenoids. The bracket is formed with a flat base portion which, for purposes of description, will be referred to as lying in a horizontal general plane with front and rear webs bend upwardly from the parallel front and rear edges of the base. The front web, and in some forms also the rear web is formed of a double thickness of the sheet metal material by reversely folding a portion of the web downwardly along the upper edge of the web. A plurality of uniformly spaced U-shaped recesses extend downwardly into the front web from its upper edge, and in one form of the invention, like aligned U-shaped recesses are formed in the rear web.

In certain embodiment, each of the solenoid valve assemblies is formed with a circumferential groove near the front end of the assembly dimensioned to permit the valve assembly to be pushed downwardly into a U-shaped groove in the front web of the bracket with those portions of the front web adjacent the edges of the U-shaped recess snugly fitting into the groove in the valve assembly. The rearward end of the valve assembly in one embodiment seated against the rear web and a rearwardly projecting tab may be received within an opening in the rear web to locate the rear portion of the assembly relative to the bracket. In another arrangement, circumferential grooves are formed near both the front and rear ends of each valve assembly to cooperate with a bracket haivng U-shaped recesses in both front and rear webs.

In some form of the invention, the solenoid valves are first individually assembled and the assembled valves are then individually assembled into the mounting bracket. Each valve is formed with a projecting nose portion, and the manifold is formed with recesses which will sealingly receive the nose portions of the valves. After all the valves have been mounted on the bracket, the manifold is pushed rearwardly onto the projecting nose portions of the valves and then mechanically attached to the mounting bracket.

In other forms of the invention, the manifold is formed with a plurality of integral uniformly spaced rearwardly projecting hollow cylindrical stems which form a structural portion of the individual solenoid valve assemblies. The fluid passages within the manifold include inlet and outlet passages opening into the interiors of the hollow stems. The valve seat of each solenoid valve is integrally formed within the interior of a stem and the central passage in the hollow stem slidably receives the valve head carrying armature and its biasing spring. Axially spaced flanges near the forward end of each stem define the groove in which the front web of the mounting bracket is seated. In an alternative arrangement, a flange is also formed near the rearward end of each stem to cooperate with U-shaped recesses in the rear bracket web.

In one embodiment, the coil of the solenoid is essentially a free standing coil having a connector member bonded to its rearward end.

In another embodiment, the connectors are integrally formed on the stem to constitute the manifold, stems and their connectors as a one piece body. In this embodiment, the solenoid coils are wound directly upon the stems between the connector and the rearward flange on the stem by a fly winding technique.

In still another form of the invention, each connector is formed with a plurality of integral support rods projecting forwardly from the connector to be integrally joined at their forward ends to an annular plate. The support rods are parallel to and symmetrically spaced about a front to rear axis and the connector-rod-plate is employed as the bobbin upon which the solenoid coil is wound. The unit is then pushed forwardly onto a stem, the plate having a stem receiving bore, and the plate functions as the rear flange of the groove defining means.

In all embodiments, the one piece metal mounting bracket functions as a low reluctance flux return path for the solenoids.

Connectors secured to the rearward ends of the stems are provided with electrical terminals connected to the coil windings. To improve the mechanical tightness of the assembly, the individual connectors may be provided with interlocking projections which are seated during assembly in recesses which in one form may be slots in the rear web and in another form may be complementary recesses in the adjacent connector.

In the assembly of the control module, the individual armatures, springs and pole pieces are first inserted into the manifold stems and the pole pieces sealed to the stem. The assembled coil-connector units are then mounted on the rear end of each stem with the stem received in a bore in the connector and the coil received on the exterior of the stem. At this point, a unitary manifold-solenoid valve assembly has been completed. This assembly is then mounted on the mounting bracket to complete the assembly of this form of control module.

Other subjects and features of the invention will become apparent by reference to the following specification and to the drawings.

IN THE DRAWINGS

Figure 1:
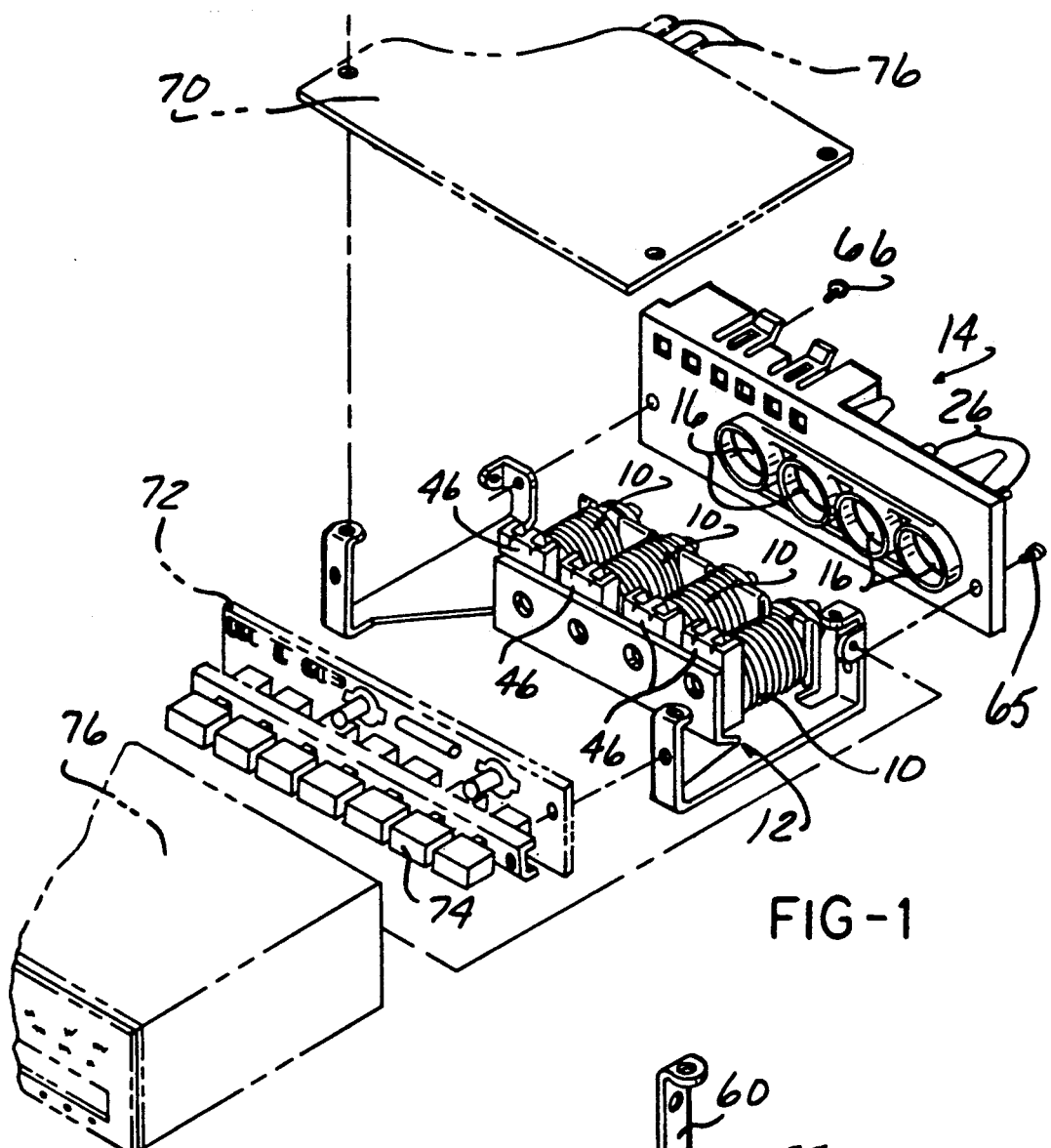
FIG. 1 is an exploded view of one form of control module assembly embodying the present invention showing the module in a partially assembled state.
Figure 2:
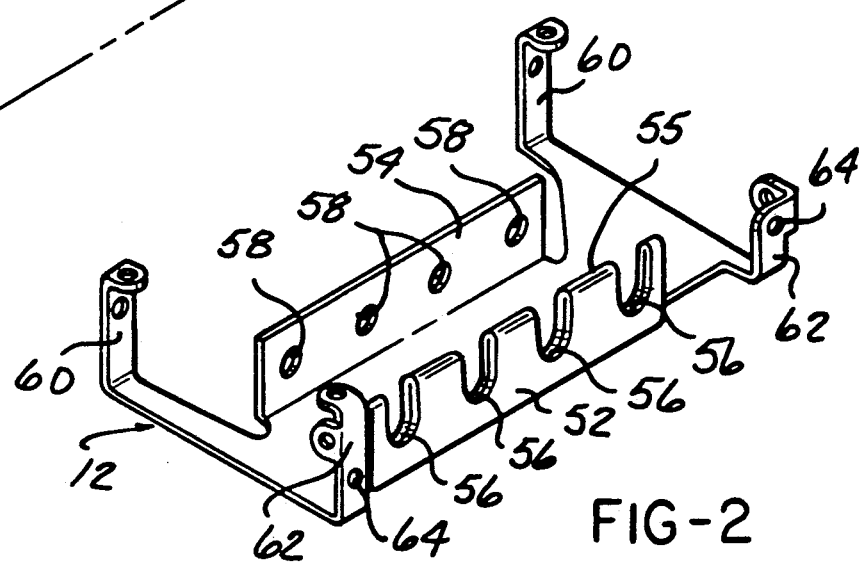
FIG. 2 is a perspective view of the mounting bracket of the embodiment of FIG. 1.
Figure 3:
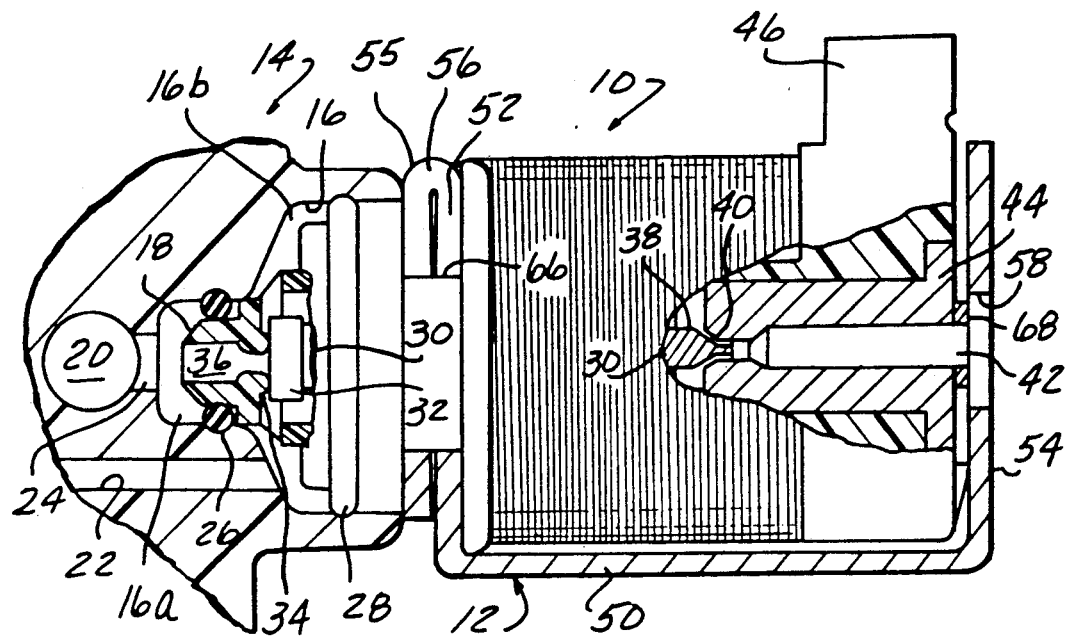
FIG. 3 is a side view, partially in section, of a solenoid valve of the embodiment of FIG. 1.

Referring first to FIGS. 1-3, a first embodiment of the present invention is shown in an exploded view in FIG. 1 with certain components not directly involved with the present invention shown in broken line. The parts shown in solid line in FIG. 1 include four like solenoid valve assemblies designated generally 10 which are mounted in side-by-side relationship in a sheet metal mounting bracket designated generally 12. In FIG. 1, a one piece manifold designated generally 14 is shown separated from the subassembly which includes valves 10 and bracket 12. Manifold 14 is formed on the side facing valves 10 and bracket 12 with four valve receiving recesses 16 which, as best seen in FIG. 3, are formed to sealingly receive the forwardly projecting nose portion 18 of the respective valves 10.

As indicated in FIG. 3, manifold 14 is formed with internal passages such as 20, 22. In the particular application shown, passage 20 is intended to be connected to a vacuum source which is connected to each of the recesses 16 as by a passage 24. A passage such as 22 extends from each of the individual recesses 16 to an outlet 26 (FIG. 1) which is intended to be connected to a vacuum actuated device to be controlled by the solenoid valve 10. A seal 26 seals that portion 16A of recess 16 which is connected to the vacuum source from a second portion 16B of the recess 16 which is in turn sealed from atmosphere as by a second seal 28.

The armature 30 of solenoid valve 10 carries a valve head 32 at its left hand end as viewed in FIG. 3 which is normally seated by a spring, not shown, against a valve seat 34 to close the right hand end of a passage 36 which opens into chamber 16A. A second valve head 38 carried on the opposite end of the armature is normally disengaged from a seat 40 which opens into a vent passage 42 through a pole piece 44 of the solenoid actuated valve. Vent passage 42 is in constant communication past armature 30 with chamber 16B, thus normally venting the controlled device (not shown) connected to passage 22. Upon energization of the coil of solenoid valve 10, armature 30 moves to the right from the position shown in FIG. 3 to seat valve 38 on seat 40, thus blocking vent passage 42, and at the same time retracting valve heas 32 away from seat 34 to permit vacuum to be applied from chamber 16A to chamber 16B and thence via passage 22 to the controlled device.

In the embodiment of FIG. 1, each of the solenoid valves 10 is separately assembled and in addition to the coil and armature incorporates both the necessary valve heads and seats together with a connector member 46 for connecting the solenoid coil to an external source of power.

As best seen in FIG. 2, mounting bracket 12 is formed from a single piece of sheet metal. The bracket is formed with a generally flat base portion 50 having a front web 52 and a rear web 54 projecting upwardly from base 50 in spaced parallel relationship to each other. Front web 52 is formed of a double thickness of the sheet metal material by folding the web downwardly along a fold line 55 which constitutes the upper edge of front web 52. Four uniformly spaced U-shaped recesses 56 extend downwardly through both thicknesses of front web 52 from its upper edge. Rear web 54 is of a single thickness of the sheet metal material and is formed with four bores or circular openings 58 respectively aligned with the U-shaped recesses 56 in front web 52. Various mounting legs such as 60, 62 are formed on the bracket for the purpose of attaching the bracket to other elements of the assembly. The front mounting legs 62 are formed with bores 64 which can receive sheet metal screws such as 65 (FIG. 1) to fixedly secure manifold 14 in its assembled relationship with mounting bracket 12 and solenoid valves 10.

As best seen in FIG. 3, solenoid valve assembly 10 is formed with an annular recess or groove 66 near its forward end which is dimensioned to fit within a U-shaped recess 56 in front web 52 of the mounting bracket. The solenoid valves 10 are assembled onto bracket 12 simply by aligning the recess 66 in the valve 10 with the recess 56 in front web 52 of the bracket and pushing valve downwardly so that the double thickness of the front web 52 is gripped between the opposite sides of the recess or groove 66 in valve assembly 10. The spacing between front and rear webs 52 and 54 is such that the connector member 46 at the rear of the assembly 10 passes just inside rear web 54 and a projection 68 on pole piece 44 frictionally contacts rear web 54.

When the coil of the solenoid 10 is energized, the metal bracket 12 functions as a low reluctance external magnetic flux return path for the magnetic circuit of the solenoid. Thus, brackets 12 functions to mechanically assemble the components of the solenoid valve module to each other, and also functions as an active part of the magnetic circuit of the solenoids.

In the embodiments of FIGS. 1-3, the solenoid valve module forms part of a climate control module for an automotive heating, ventilating and air conditioning system. In addition to the valve module, such a climate control module includes two circuit boards 70, 72 which are assembled to mounting bracket 12, the circuit board 72 having a plurality of switches, such as 74 to actuate the valves in any desired heating, air conditioning, defrosting or various related ventilating modes. The assembled valve module and circuit boards is slipped into a box-like container which is in turn secured to mounting bracket 12. This assembled package is then installed in the vehicle with the external vacuum and control connections for the vacuum circuit and electrical connections such as 76 seating in electrical terminals and holds couplings previously installed in the vehicle. In this particular application, the entire control module, including selector switches and electrical circuitry for controlling energization of the solenoids is contained within a single package. Further details of this control module are set forth in parent application Ser. No. 07/324,766.

A second embodiment of the present invention is shown in FIGS. 4-7.

In the embodiment of FIG. 1, each of the individual solenoid valves 10 was preassembled, and the steps of assembling the valve module involved simply the insertion of the valve assemblies 10 into mounting bracket 12, followed by the seating of manifold 14 onto the valve-mounting bracket subassembly.

While mounting bracket 12 and manifold 14 are each of one piece construction, the individual solenoid valve assemblies 10 each include several individual component parts which must be assembled into a valve assembly 10 before the valve assembly 10 is ready for installation into the mounting bracket. Because the valves 10 are initially assembled separately from the manifold, it is necessary, as described above, to provide each valve with two seals—to seal the valve inlet passages from each other and from atmosphere. In the embodiment of FIGS. 4-7, a modified form of one piece manifold incorporates portions of each of the individual valves in a manner such that seals between the valve assemblies and the manifold are not required.

Figure 4:
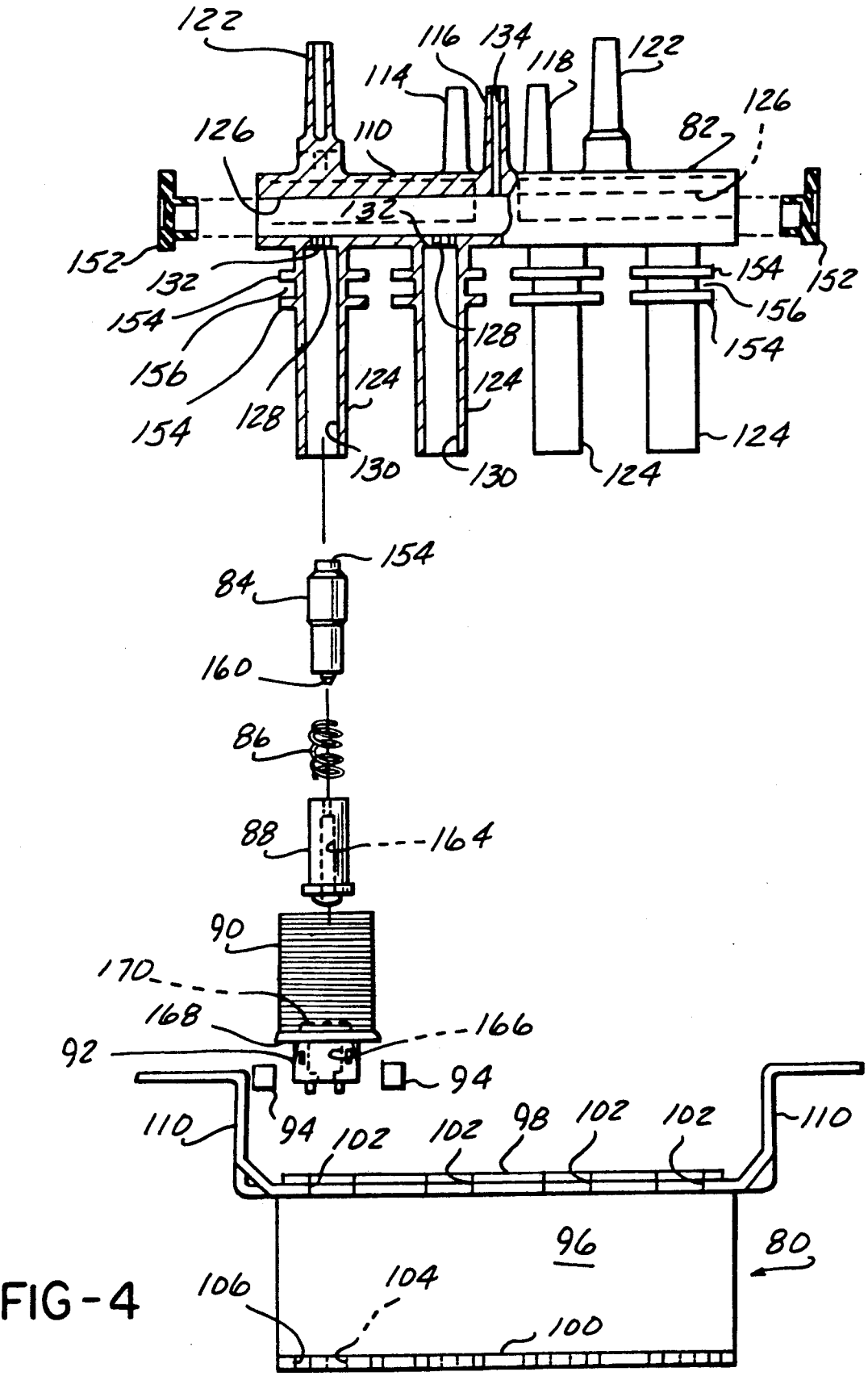
FIG. 4 is an exploded view, partially in section, of a second embodiment of the invention.

Referring first to FIG. 4, the component parts of an improved solenoid valve module include a one piece sheet metal mounting bracket designated generally 80, a one piece manifold designated generally 82 and, for each of four solenoid actuated valves, an armature 84, a spring 86, a pole piece 88, a free standing coil 90 bonded at one end to a connector 92 and two electric terminals 94 for terminating the ends of the coil winding.

Figure 7:
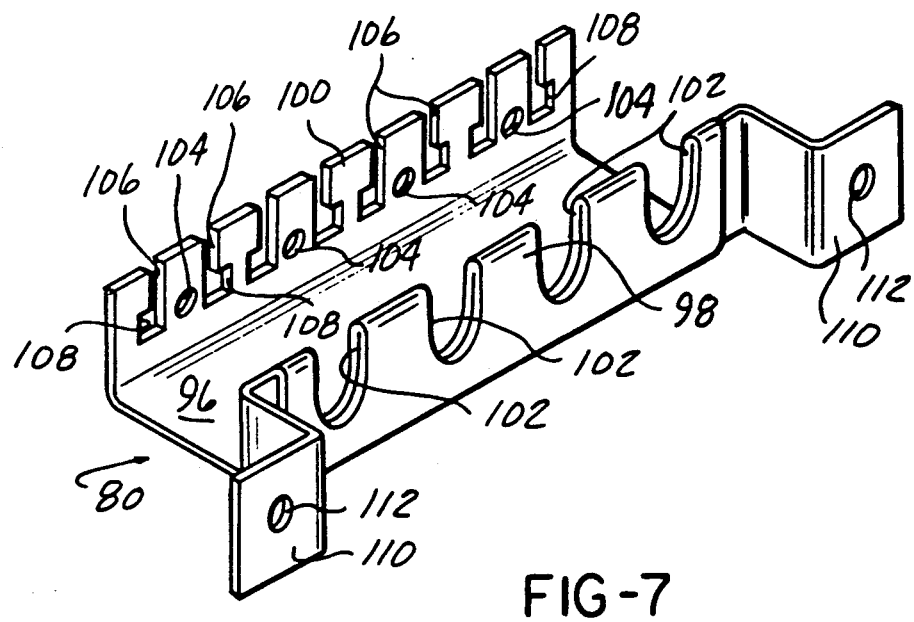
FIG. 7 is a perspective view of the mounting bracket of the embodiment of FIG. 4.

The mounting bracket 80 is quite similar to the mounting bracket 12 of the FIG. 1 embodiment in that it includes a base 96 having front and rear webs 98 and 100 respectively projecting upwardly from the base in spaced parallel relationship to each other. As in the embodiment of FIG. 1, the front web 98 of bracket 80 is formed of a double thickness of the sheet metal material from which the bracket is formed and the front web of the bracket is formed with four U-shaped recesses 102 extending downwardly into the web from its upper edge. Rear web 100 is of a single thickness of material and, as best seen in FIG. 7, is formed with four uniformly spaced bores 104. At either side of each bore 104, a pair of vertical slots 106 extend downwardly through web 100 to enlarged openings 108 at the bottom of each slot. Mounting webs such as 110 may project forwardly from front web 98 and be formed with bores such as 112 to receive mounting screws which, in this embodiment, will mount the bracket upon some support structure.

Manifold 82 (FIG. 4) is designed to incorporate not only the supply and control passages for the various valves, but also valve seats and valve inlet and outlet passages for the respectively valves. Manifold 82 is formed by molding a suitable thermoplastic material into an elongate main body portion 110 having a plurality of connecting nipples 114, 116, 118 and 120 and two locator studs 122 for guiding and coupling the manifold to a mating connector block projecting forwardly from main body. Four hollow cylindrical stems 124 are integrally joined at their forward end to main body 110 and extend rearwardly from body 110 in uniformly spaced parallel relationship to each other.

A main supply passage 126 extends longitudinally of main body 110 from end to end and communicates with the hollow interior of each of stems 124 via passages 128 which open into the hollow interior passage 130 of each stem 124 through a valve seat 132. Supply passage 126 is intended to be connected at all times to a vacuum source via a passage 134 through the central nipple 116.

Figure 5:
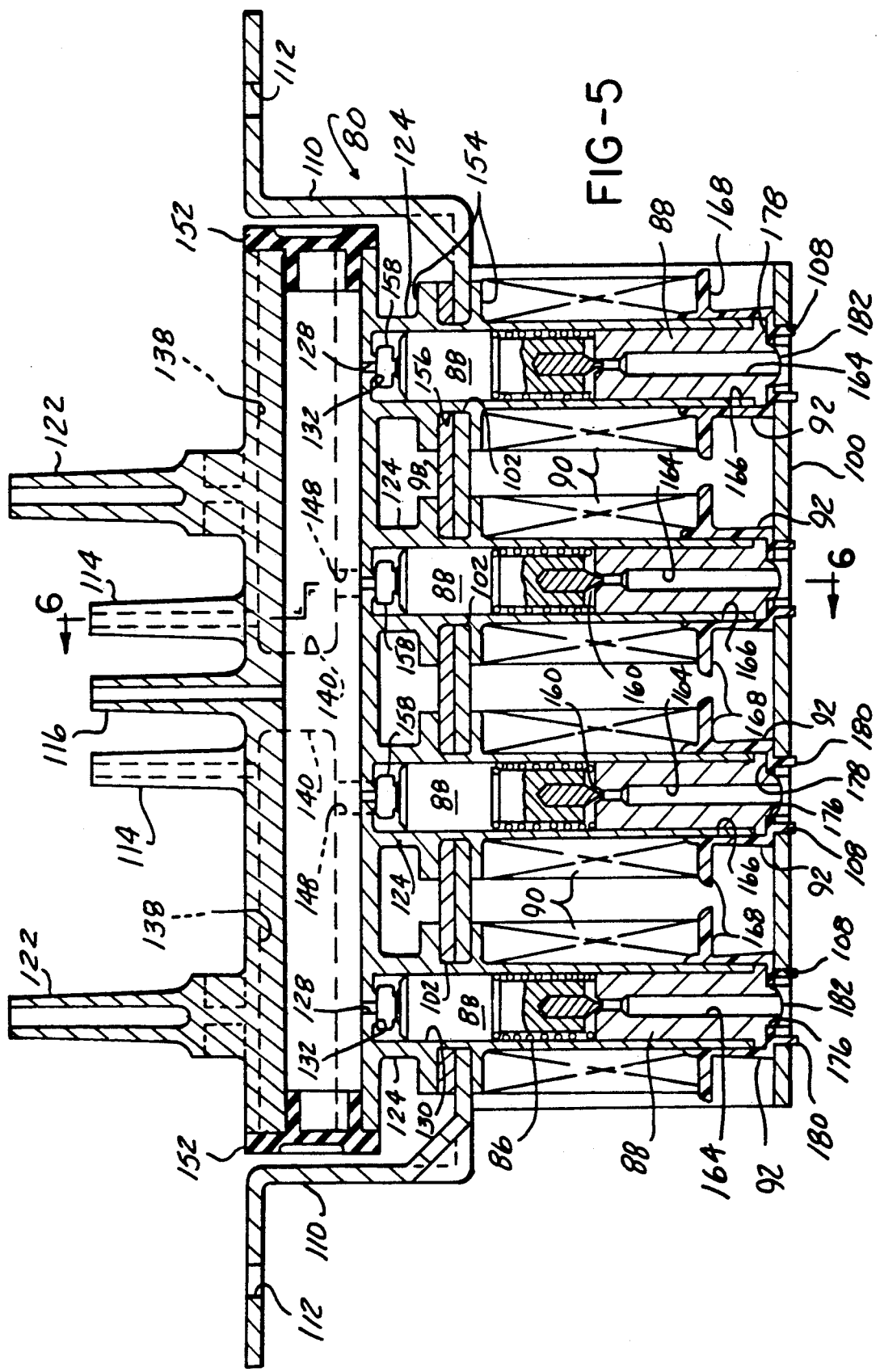
FIG. 5 is a detailed cross sectional view of the embodiment of FIG. 4, showing the module of FIG. 4 in its assembled condition.

In addition to the supply passage 126, four additional passages are formed in main body 110. In the cross sectional view of FIG. 6, two of these four additional passages are shown, one passage 136 being located above supply passage 126 and the other passage 138 being located below passage 126. Passages 136 and 138 extend inwardly from each of the opposite ends of body 110 by a distance less than one-half of the length of the body. As best seen in FIG. 5, the lower passages 138 terminate at blind end walls 140, each passage 138 extending past two stems 124. Upper passages 136 likewise extend inwardly from the opposite ends of body 110 and terminate at blind end walls 142. Each lower passage 138 is in communication with a passage 144 which extends from the passage 138 to open at the outer end of one of a pair of lower nipples 114, while each upper passage 136 is in constant communication with a passage 146 which opens through the outer end of one of a pair of upper nipples 118. The nipples 118 and 114 vertically overlie each other, thus as viewed in FIG. 4, a lower nipple 114 appears in the sectioned portion because it lies below the plane of the cross section, while in the unsectioned portion of the main body 110 in FIG. 4, an upper nipple 118 appears which directly overlies a second lower nipple 114.

The passages 130 of the two innermost stems 124 communicate via a passage 148 with the respective lower passages 138 in main body 110. The two outermost stem passages 130 communicate with the respective upper passages 136 via passages 150. The passages 126, 136, 138, 130, 148 and 150 are formed by cores inserted into the molding cavity during the molding of the manifold. After the manifold has been removed from the mold and the cores extracted, manifold plugs 152 are inserted into the open ends of the passages 126, 136, 138 and welded in place.

Each stem 124 is formed with a pair of radially outwardly projecting flanges 154 near its forward end which are axially spaced from each other to define a circumferential groove 156 between the two flanges. The axial spacing between the two flanges 154 is substantially equal to the doubled thickness of front web 98, and in the assembly of the unit, the four stems 124 are seated into the U-shaped recesses 102 of front web 98 of the bracket as shown in FIG. 5.

Armature 84 is constructed with a valve head 158 at one end of the armature adapted to seat against the valve seat 132 formed on the manifold at the inlet to each passage 130 and is formed with a second valve head 160 at its opposite end adapted to seat within a valve seat 162 at one end of pole piece 88, valve seat 162 being formed at one end of a vent passage 164 extending coaxially through pole piece 88. Armature 84 is loosely slidably received within the passage 130 of the stem with a clearance sufficient to accommodate the flow of air through passage 130 past the armature.

Solenoid coil 90 is wound upon a mandrel of a coil winding machine essentially as a free standing coil—that is, the coil is wound directly upon the mandrel and not upon a bobbin, and is removed from the mandrel after the coil has been wound. However, the connector member 92 is mounted on the mandrel during the winding operation to form a part of the wound coil and connector assembly.

Connector 92 is formed of an electrically non-conductive material with a bore 166 extending through the member. A radially outwardly projecting annular flange 168 is integrally formed on member 92 near its forward end and a forwardly projecting annular lip 170 projects forwardly from flange 168 in coaxial relationship with bore 166. During the winding operation, the end of the mandrel of the winding machine is seated within bore 166, and the coil is wound upon the mandrel and upon flange 170 to extend axially between flange 168 and a flange on the mandrel. The ends of the wire W of the coil winding extend from the coil through to notches 172 in the top of the connector and at the completion of the winding operation, metallic terminals such as 94 are mechanically seated in the notches to make electric contact with the wire W in the notch. Many forms of terminals are commercially available for this specific purpose, terminals of this type and tooling for installing the terminals being commercially available from AMTRONICS, INC., of Brooklyn, N.Y., for example. The specific form of terminal employed will depend upon the type of external electrical connection which is to be made to the coil.

After the coil has been wound and the terminals 94 installed, while the connector and coil are still upon the mandrel, an electric current is passed through the coil by means of the installed terminals to heat the insulation of the magnet wire to the point where the turns of the coil are bonded to each other and to the connector member 92. After this bonding step is completed, the connector and coil are removed as a unit from the mandrel.

While this bonding operation does not produce an extremely rigid structure, it bonds the coil to the connector sufficiently firmly so that the assembly may be handled by gripping the connector, rather than the coil, which may be easily deformed if gripped too firmly. The ability to handle the coil-connector assembly by gripping the connector decreases the risk of deforming the coil during manual handling and provides the possibility of handling the coil and connector by automated assembly devices.

Figure 6:
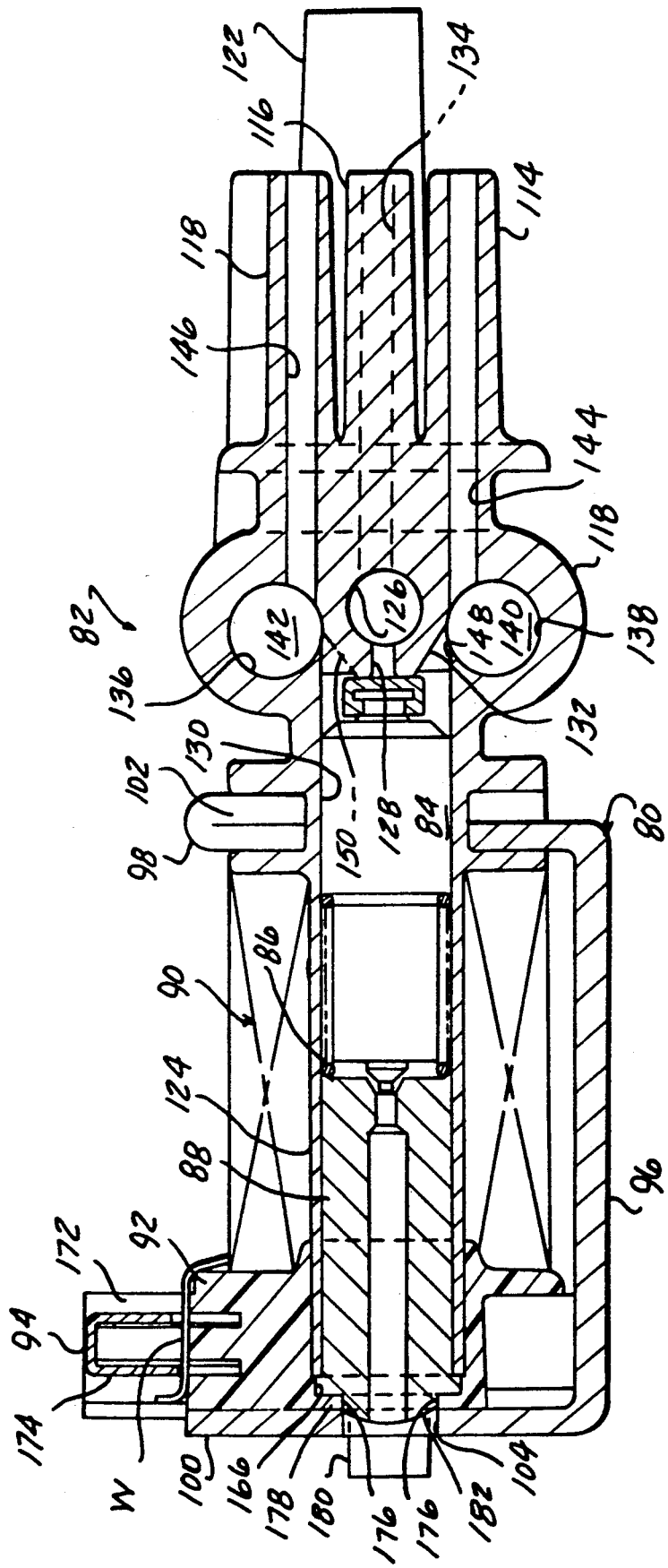
FIG. 6 is a detailed cross sectional view taken on the line 6—6 of FIG. 5.

Referring now particularly to FIGS. 5 and 6, at its rearward end, bore 166 through connector 92 is formed with a reduced diameter end section 176 which extends through a relatively thin end wall portion 178 of connector 92. At opposite sides of the reduced diameter bore 176, a pair of tabs 180 project rearwardly from connector 92. During the assembly process to be described below, the tabs 180 on the connector slide downwardly through the slots 106 (FIG. 7) at opposite sides of a bore 104 in rear web 100, the tabs being compressed slightly toward each other by the slots 106. When the connector 92 is fully seated in rear web 100, the tabs 180 spring outwardly into the enlarged width portions 108 at the bottom of slots 106 to lock the connector in place. The rearward end of pole piece 88 is formed with a convexly rounded end section 182 dimensioned to project through the reduced diameter bore 176 of connector 92 into contact with web 100 around the periphery of bore 104 in the web.

Assembly of the multi-valve module of FIGS. 4–7 is best described with reference to FIG. 4. After the manifold has been completed by welding the end plugs 152 in the opposite ends of the manifold, coil 90 has been wound upon connector 92 and terminals 94 installed, and bracket 80 has been formed, the first step in the final assembly procedure is to insert an armature 84 into each of the stems 124. A spring 86 is then inserted into each stem, and a pole piece 88 is then inserted into each stem and welded in its assembled position to seal the open end of the passage 130 in each stem.

A coil-connector subassembly 90, 92 is then slid onto each stem 124 until the front end of the coil is in abutment with the rearward flange 154 of the stem. The rearward ends of the stems are seated in the bores 166 in the connector members, which are then bonded, as by ultrasonic welding, to the stem.

The manifold-coil subassembly is then mounted upon the bracket 80 simply by pressing it downwardly with those portions of the stems between flanges 154 moving downwardly within the U-shaped recesses 102 of the front web of the bracket and the rearwardly projecting tabs 180 on the connectors 92 sliding downwardly through slots 106 in rear web 100 of the bracket. The spacing between flanges 154 on the stem is matched to the thickness of front web 98 so that the web is frictionally gripped between the flanges 154 of each stem. As explained above, at the rearward end of the manifold-coil assembly the projecting tabs slide downwardly through the slots 106 until they can spring outwardly into a snap fit within the enlarged lower ends 108 of slots 104. As the tabs 180 snap into place in the enlarged lower ends 108 of slots 106, the rounded concave end of each pole piece seats into the bore 104 of rear web 100.

Figure 8:
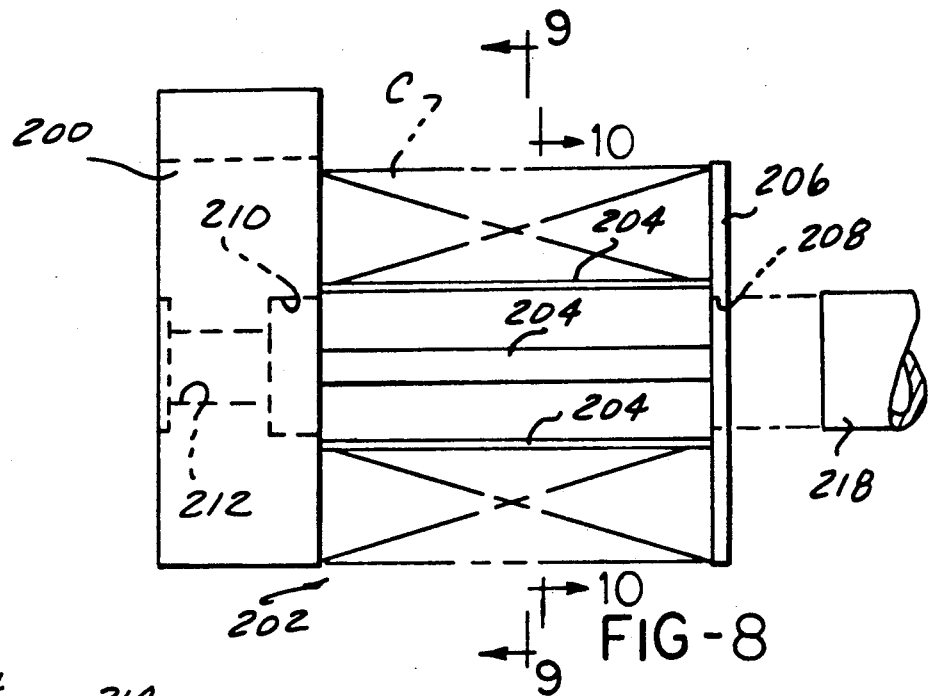
FIG. 8 is a side elevational view of one piece connector-flange bobbin employed in another embodiment of the invention.
Figure 9:
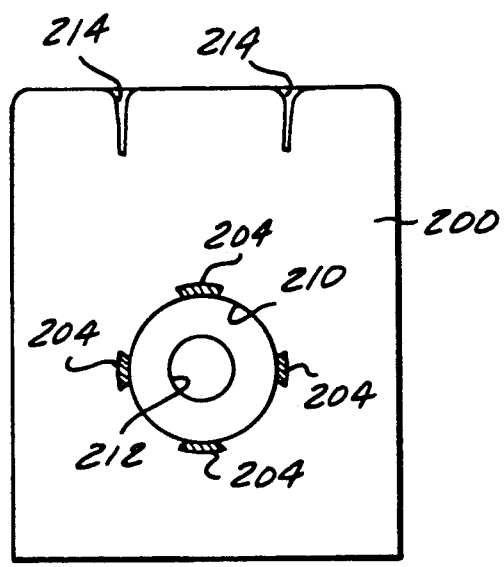
FIG. 9 is a cross sectional view of the bobbin of FIG. 8 taken on the line 9—9 of FIG. 8.
Figure 10:
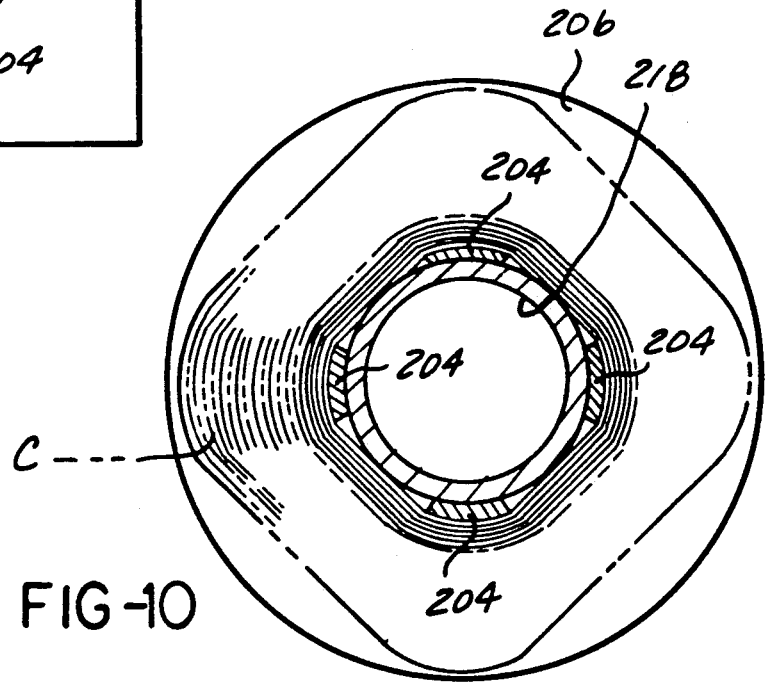
FIG. 10 is a cross sectional view of the bobbin of FIG. 8 taken at the location of the line 10—10 of FIG. 8, showing the coil wound upon the bobbin.

Another embodiment of the invention is disclosed in FIGS. 8-11. In the embodiment of FIGS. 8-11, the connectors 200, which correspond to the connectors 92 of the FIG. 4 embodiment are formed as an integral component of a solenoid coil bobbin designated generally 202 (FIG. 8). Four or more elongate rod like support members 204 project forwardly from the connector 200 and are integrally joined at their forward ends to a plate like flange 206. The connector 200, support members 204 and flange 206 are formed integrally with each other. Flange 206 has a central stem receiving bore 208 extending through the flange, and the connector 200 is formed with a stem receiving counterbore 210 in its front face and a pole piece receiving bore 212 extending rearwardly from counterbore 210 through connector 200. The support members 204 are symmetrically disposed around the peripheries of bores 208, 210 as best seen in FIGS. 9 and 10.

The solenoid coil C is wound directly upon the bobbin 202 and the ends of the coil winding are seated in slots 214 in the connector portion 200 for coupling to electric terminals, such as the terminals 94 described in connection with the FIG. 4 embodiment.

Figure 11:
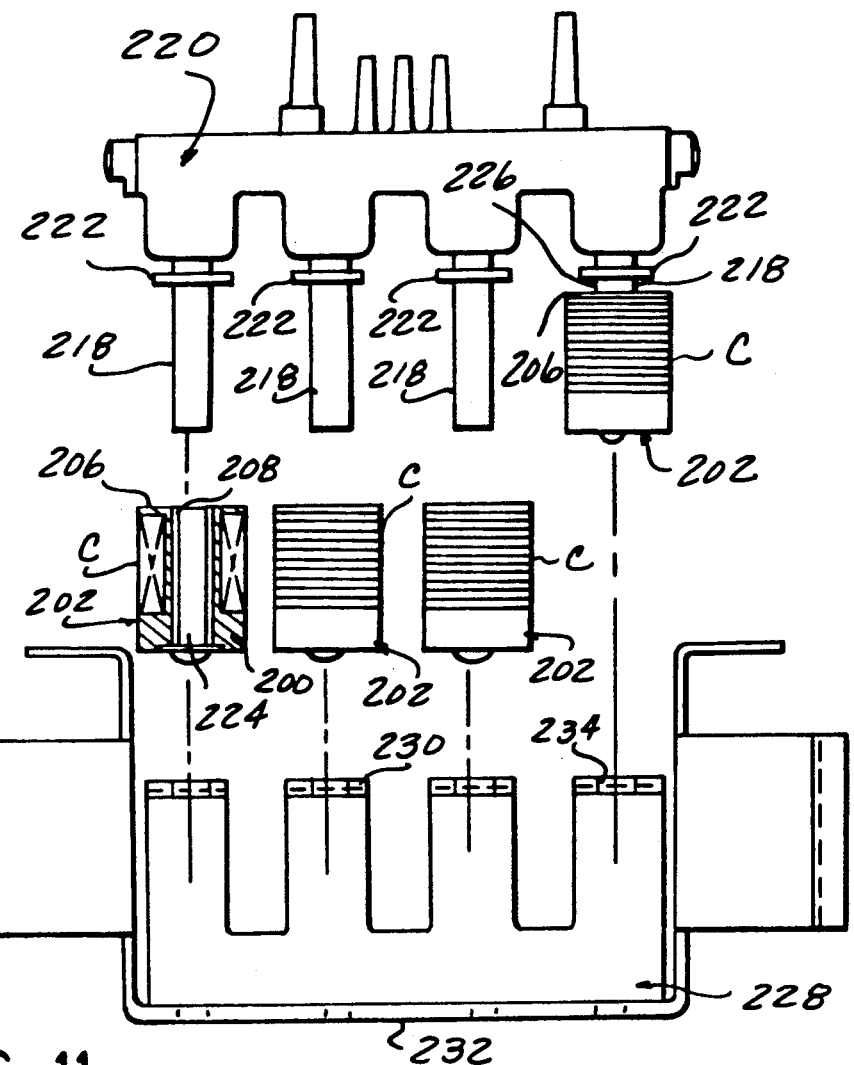
FIG. 11 is an exploded plan view, with certain parts shown in section, of the components of a module employing the bobbin of FIG. 8.

Referring now particularly to the cross sectional view of FIG. 10, it is seen that the radially inner sides of the support members 204 are located and conformed to slidably engage and receive the outer surface of a stem 218 formed on a manifold 220 (FIG. 11). The cross sectional configuration of the individual support members 204 is such that the innermost windings of the coil C will tangentially engage, or preferably slightly clear the outer surface of the stem to accommodate assembly of the bobbin-coil upon the stem.

Referring now particularly to FIG. 11, the manifold 220 of the FIGS. 8-11 embodiment may be of a construction substantially identical to that of the manifold 82 of the FIG. 2 embodiment, with the exception that the stems 218 of the FIGS. 8-11 embodiment are formed with but a single radially projecting flange 222 adjacent the forward end of the stem. The flanges 222 of the FIGS. 8-11 embodiment perform the function of the forward most flanges 154 of the FIG. 4 embodiment, while the flange 206 of bobbin 202 performs the function of the rearward most flange 154 of the FIG. 4 embodiment.

The internal passage arrangement, valve seats, etc., of the manifold 220 may be the same as those of the manifold 110.

Assembly of the embodiment of FIGS. 8-11 is best followed by reference to FIG. 11. It will be assumed that valve armatures and biasing springs, which may be of the same construction as the armatures 84 and springs 86 of the FIG. 4 embodiment have been inserted into the respective stems 218 in FIG. 11 and that pole pieces 224, of a construction identical to the pole pieces 88 of the FIG. 4 embodiment have been fixedly and sealingly mounted in the assembled coil and bobbins 202 as shown in FIG. 11. The coil and bobbins assemblies are then simply slipped onto the rearward ends of the stems 218 and, when the rearward end of the stem is seated in the counterbore 210 of the connector 200, the coil and bobbin assembly will be positioned upon its stem as shown at the right hand most stem of FIG. 11, with the flange 206 of the bobbin 202 being spaced rearwardly from the flange 222 integral with the stem to provide a circumferentially groove between the two flanges.

After all coil-bobbin assemblies have been mounted on their respective stems, the coil and manifold subassembly is seated in a one piece sheet metal bracket 228 having front and rear webs 230, 232, functionally equivalent to the webs 98, 100 of the FIG. 4 embodiment. As in the FIG. 4 embodiment, the front web 230 of the mounting bracket 228 is of a doubled thickness of a sheet metal and U-shaped recesses 234 are formed, as in the FIG. 4 embodiment, to be received within the grooves 226 of the manifold assembly with the rearward ends of the connectors 200 abutting the front face of the rear web.

Figure 12:
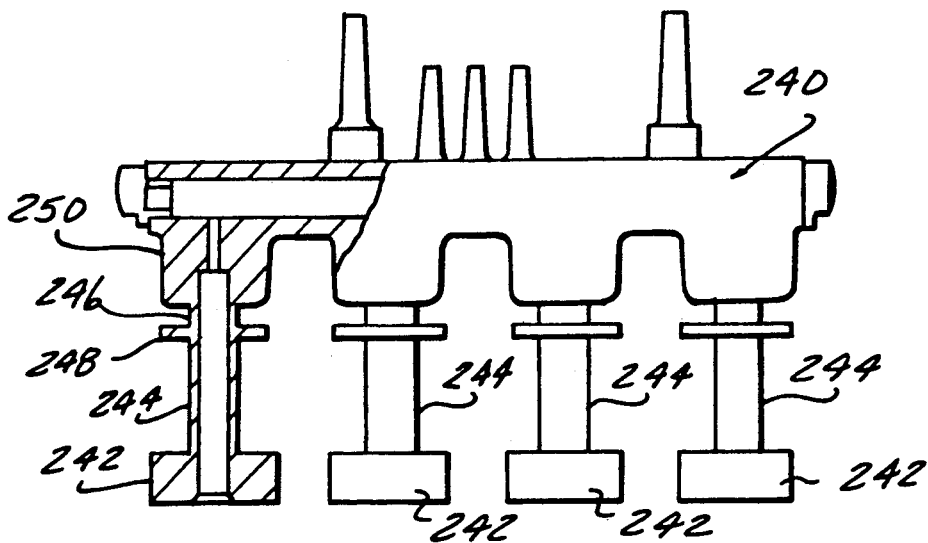
FIG. 12 is a plan view, partially in cross section of a modified form of manifold employed in still another embodiment of the invention.

In FIG. 12, a modified one piece manifold designated generally 240 is disclosed. As compared to the manifolds of the previously described embodiments, the manifold 240 of FIG. 12 finds the connectors 242, which correspond to the connectors 92 of the FIG. 4 embodiment or the connector portions 200 of the FIGS. 8-11 embodiment, are formed integrally upon the rearward ends of the various stems 244 of the manifold. The internal passages in the manifold body 240 and stems 244 may be of the same arrangement as the previously described embodiments. In the FIG. 12 manifold, the groove 246 which is to be seated in the U-shaped recess of the sheet metal mounting bracket is defined between a single radially projecting flange 248 formed on the stem 244 in rearwardly spaced relationship to an enlargement 250 on the main manifold body.

The solenoid coils are wound directly upon the stems 244 of the manifold body 240 between the flanges 248 and the forward faces of the connector portions 242. Specialized commercially available coil winding machines are available which can simultaneously wind coils upon each of the four stems 244 of the manifold 240 in a fly winding operation. In some cases, it may be necessary to increase the spacing between the stems 244 to accommodate this coil winding technique.

Before the coils are wound upon the stems 244, the armatures, springs and pole pieces are inserted into the stems from their rearward ends and the pole piece is secured to the stem by a friction fit alone or by welding. An air tight seal is created between the pole piece and the stem. The coils are then wound upon the stems and the completed coil-manifold assembly is seated onto a one piece sheet metal mounting bracket of a construction similar to that of a previously described embodiment.

Figure 13:
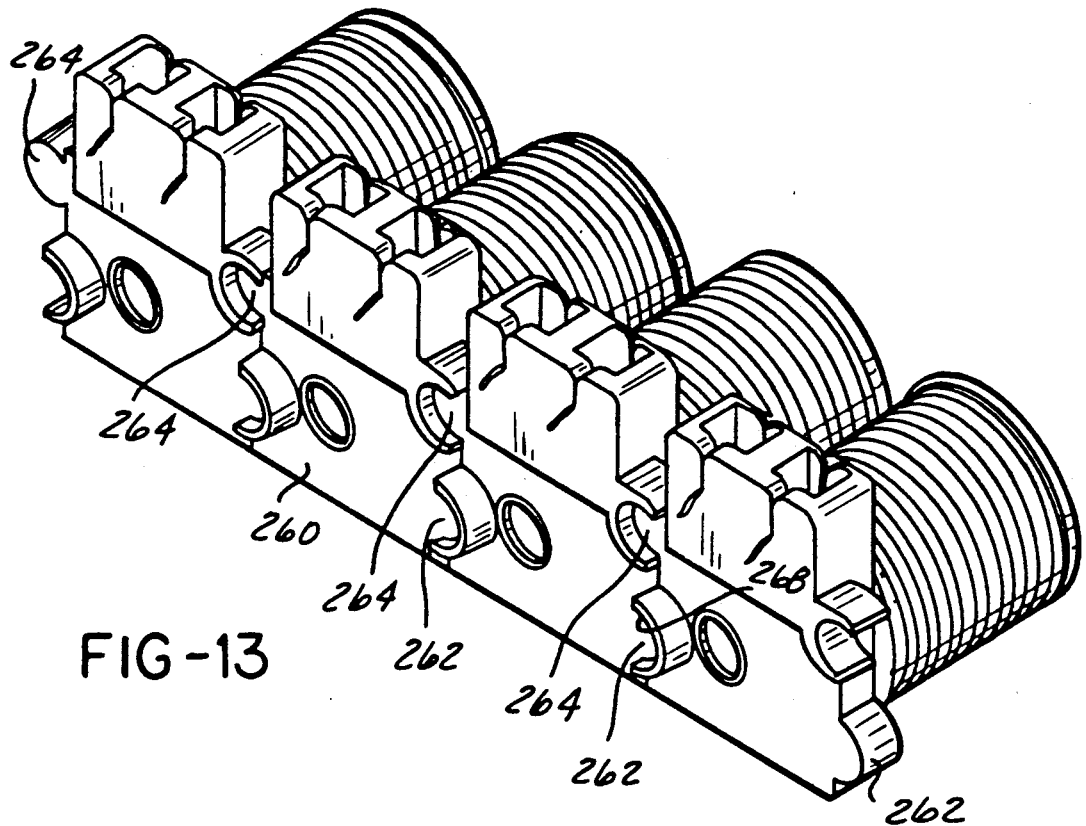
FIG. 13 is a perspective view of a multiple solenoid coil assembly employing a modified form of connector.
Figure 14:
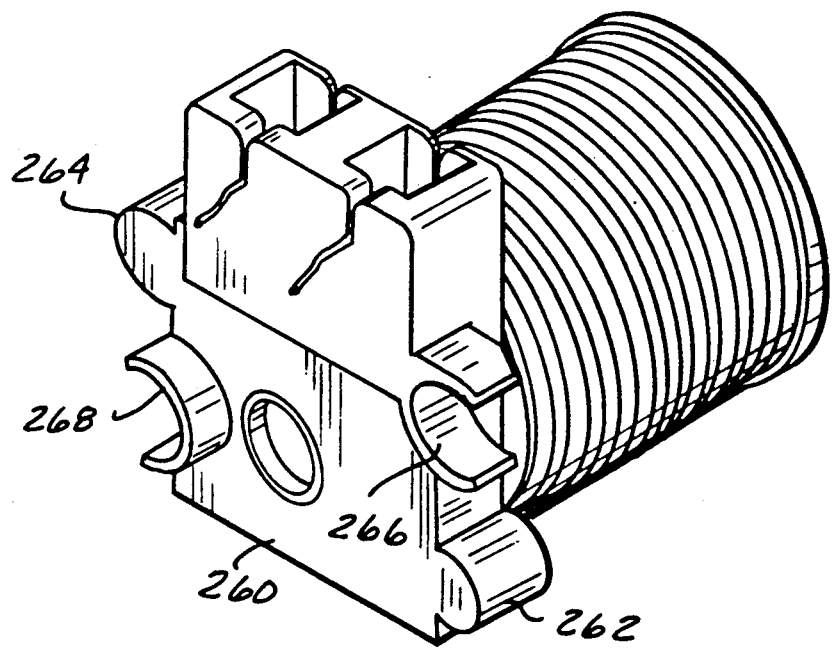
FIG. 14 is a perspective view of a single coil-connector assembly employed in the embodiment of FIG. 13.

In FIGS. 13 and 14, there is disclosed a modified form of connector which enables the connectors to be mechanically interlocked with each other in the assembled device. As best seen in FIG. 14, each individual connector 260 is formed with a generally cylindrical projection such as 262, 264 on each of its opposite sides and complementary recesses 266 and 268 so located on opposite sides of the connector as to slidably interlock with each other as shown in FIG. 13. The interlocking connection accommodates forward and rearward sliding movement of one connector relative to the other, but positively restrains the interlocked connectors against relative movement in any direction lateral to the forward and rearward direction. In that the connectors, when assembled into a sheet metal mounting bracket such as those described above, will be in face-to-face abutment with the rear web of the bracket, and thus restrained against any forward and rearward movement, the interlocking projections and recesses of the connector shown in FIGS. 13 and 14 will provide a more rigid assembly.

It is believed apparent that the mounting tab—rear web slot interlock of the embodiment of FIG. 4 might equally well be employed with the connectors 200 of the embodiment of FIGS. 8- 11 or the connector portions 242 of the FIG. 12 manifold. The interlocking type connectors of FIGS. 13 and 14 are equally well adapted for use with the connector 200 of the FIG. 8 embodiment.

Figure 15:
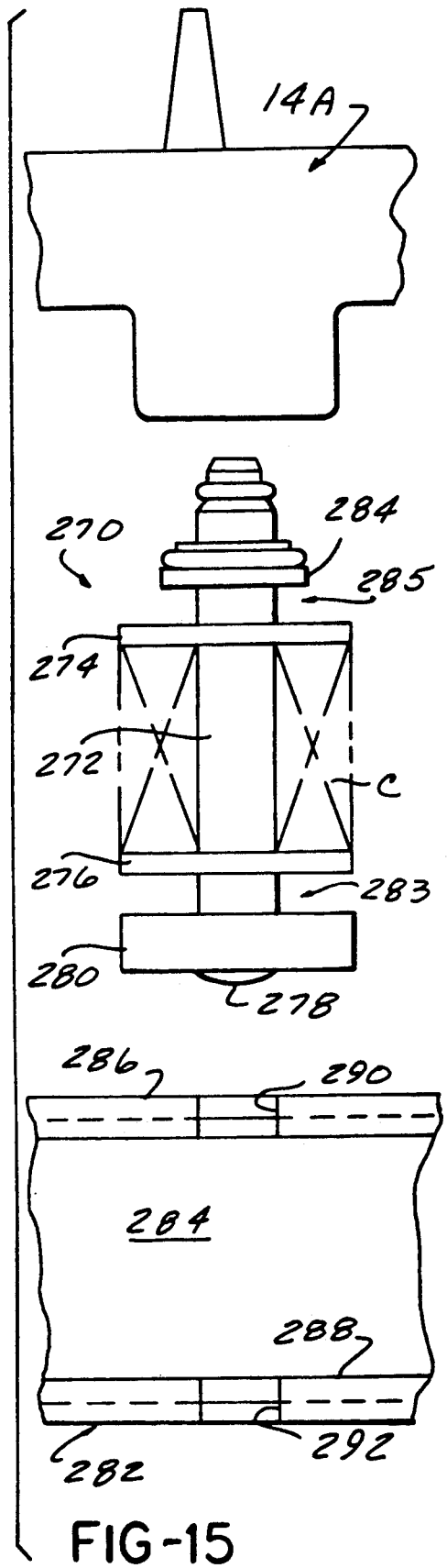
FIG. 15 is an exploded plan view, with certain parts broken away or omitted, of another embodiment of the invention.
Figure 16:
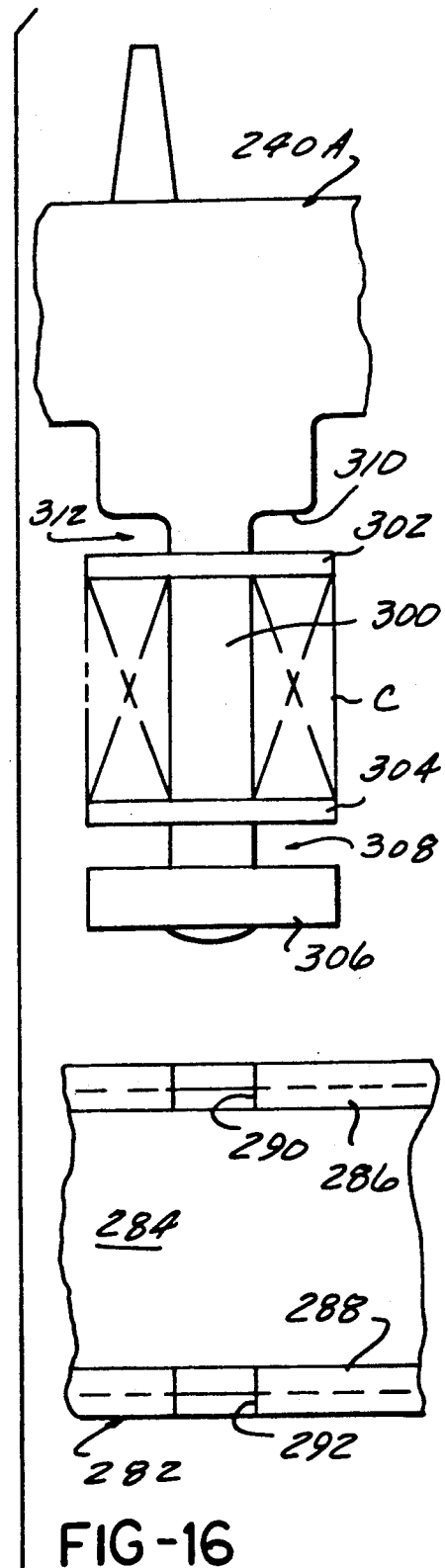
FIG. 16 is an exploded plan view, with certain parts broken away or omitted, of an alternative form of the FIG. 15 embodiment.
Figure 17:
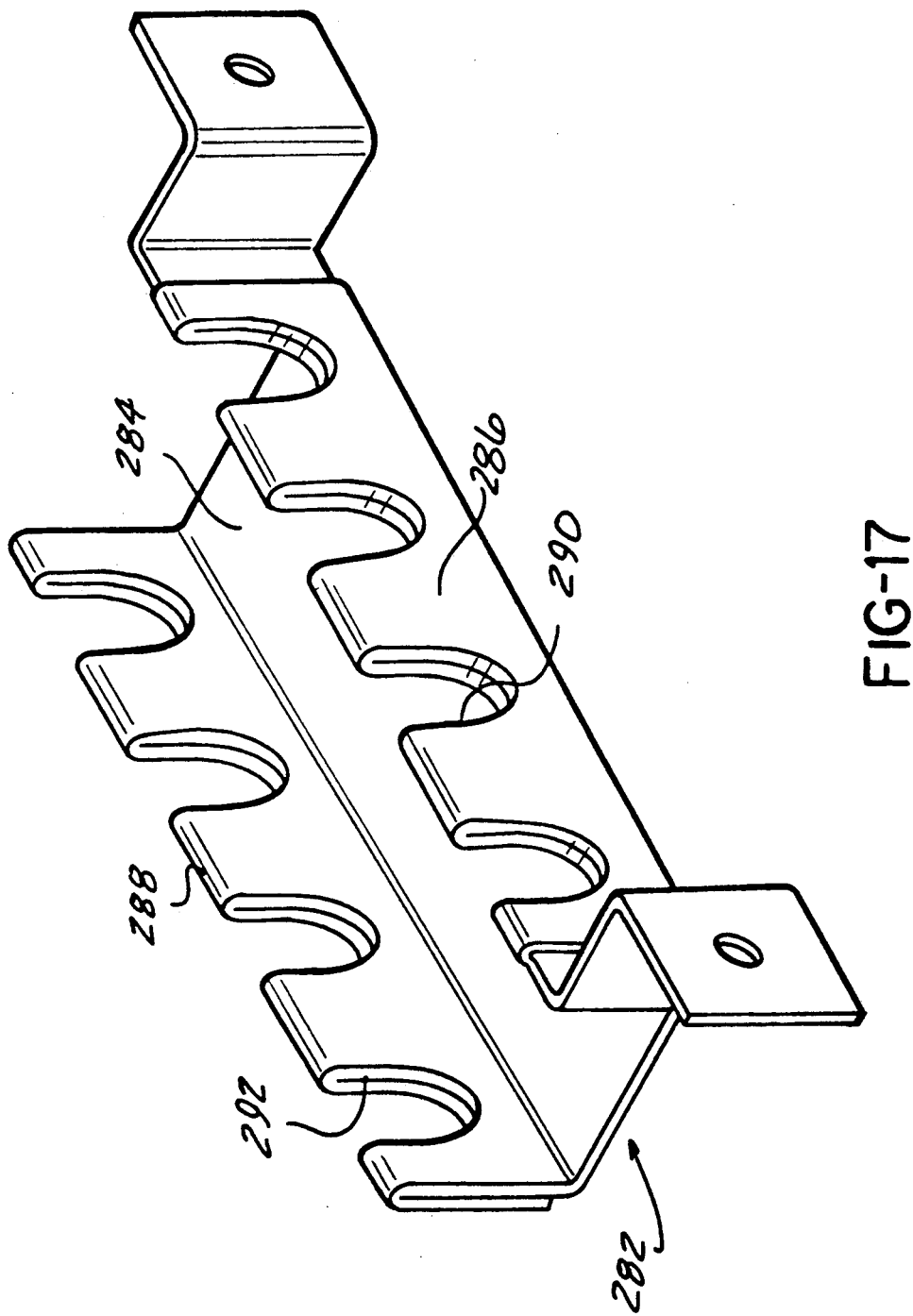
FIG. 17 is a perspective view of a mounting bracket employed in the embodiments of FIGS. 15 and 16.

Two related additional embodiments of the invention are shown in FIGS. 15-17. In FIGS. 15 and 16, only a single solenoid valve assembly is shown with related portions of a manifold and mounting bracket, however, it is believed apparent that the parts as shown in FIGS. 15 and 16 represent only a portion of a multiple solenoid valve assembly such as those described above.

The embodiment of FIG. 15 is quite similar in certain respects to the embodiment of FIGS. 1-3 described above in that the manifold 14A, only a portion of which is shown in FIG. 15, is of substantially the same construction as the manifold 14 of the embodiment of FIGS. 1-3, and in FIG. 15, the solenoid valve assembly 270 is complete and self-contained to be plugged into the manifold 14A in the same fashion as the individual solenoid valve assemblies 10 are plugged into the manifold 14 of the FIG. 1-3 embodiment.

The valve assembly 270 of FIG. 15 is formed with a hollow tubular stem 272 upon which are integrally formed a front 274 and rear 276 radially projecting flange. As in the previously described embodiments, the valve head and valve spring are received within the forward end of sleeve 70 and a pole piece 278 is sealingly received within the rearward end of stem 272. Stem 272 and flanges 274, 276 serve as a solenoid bobbin upon which the solenoid coil C is wound upon stem 272 to extend between flanges 274 and 276.

In the embodiment of FIG. 15, the electrical connector block 280 is mounted on the rearward end of the stem 272 in rearwardly spaced relationship to the rear flange 276 to define an annular mounting bracket web receiving groove 282 at the rearward end of the assembly. A mounting flange 284 is integrally formed on stem 272 in forwardly spaced relationship to front flange 274 to define a similar annular web receiving groove 286 near the forward end of the assembly.

As best seen in FIG. 17, the mounting bracket 282 employed in the FIG. 15 embodiment is formed of a single piece of sheet metal material to include a base portion 284 having front and rear webs 286, 288 projecting upwardly from the base portion 284 in spaced parallel relationship to each other. Both of front and rear webs 286 and 288 are formed of a doubled thickness of the sheet metal material of the bracket by folding the sheet metal material downwardly from the upper edge of the web in the same manner as the front webs of the previously described mounting bracket. Both of the front and rear webs 286, 288 are formed with a plurality of upwardly opening U-shaped recesses as indicated at 290, 292, the recesses in front web 286 being aligned with the corresponding recesses in the rear web. As in the previous cases, the width of the U-shaped recesses 290, 292 will slightly exceed the outer diameter of the stem 272 of the valve assembly.

The width of grooves 282, 285 axially of valve assembly 270 is substantially equal to the thickness of the respective rear 288 and front 286 webs of mounting bracket 282 and the axial spacing of the grooves 282, 285 corresponds to the spacing of the front and rear webs of the bracket. The folding of the front and rear webs 286, 288 of the bracket to achieve the doubled thickness of the web normally produces a slight spacing between the opposed faces of the doubled thickness portions of the web which in turn enables the two thicknesses of the individual web to be resiliently compressed to some extent toward each other.

It is believed apparent that valve assembly 270 may be seated in mounting bracket 282 by seating those portions of stem 272 constituting the bottoms of grooves 285 and 282 respectively in U-shaped recesses 290 and 292 in the front and rear webs of bracket 282. The front and rear faces of webs 286, 282 are gripped between the radially extending faces of recesses 285, 282, and the slight compressibility of the doubled thickness webs provide a firm frictional grip between the bracket and valve assembly.

The embodiment of FIG. 16 differs from the embodiment of FIG. 15 in that each valve assembly includes a hollow tubular stem 300 which is integrally joined at its forward end to a manifold 240A which, for purposes of explanation, may be assumed to be of substantially the same construction as the manifold 240 of the FIG. 12 embodiment described above. Like the embodiment of FIG. 15, the FIG. 16 embodiment includes a front 302 and a rear 304 radially projecting flange integrally formed on the stem 300. As described above in connection with the FIG. 12 embodiment, the solenoid coil C of the FIG. 16 embodiment may be wound by a fly winding technique directly upon stem 300 between flanges 302 and 304, and this fly winding technique can simultaneously wind coils on a plurality of stems integrally joined to the manifold as in FIG. 12.

As was the case with the FIG. 15 embodiment, the FIG. 16 embodiment includes an electrical connector block 306 mounted on the rearward end of stem 300 in rearwardly spaced relationship to the rearward flange 304 to define with the flange an annular groove 308 in the valve assembly. In most cases, it is preferred to make the connector block as a separate element which is not mounted on the stem until after the coil is fly wound on the stem. Front flange 302 is rearwardly spaced from a rearwardly facing surface 310 on manifold 240A to define an annular web receiving groove 312 in the assembly of FIG. 16. The FIG. 16 assembly may utilize the same mounting bracket 282 as was utilized in the FIG. 16 embodiment. It is believed apparent that the assembly of the manifold-valve assembly to the mounting bracket is similar to that described above in connection with the FIG. 15 embodiment.

The one piece sheet metal mounting bracket employed in all embodiments of the invention provides a mechanically tight assembly in that the spacing between the front and rear webs of the bracket and the resilient compressibility of the doubled thickness webs enabled the bracket to firmly grip the manifold-coil assembly to frictionally retain the manifold-coil assembly in the webs of the bracket.

The metal bracket at the same time provides a low reluctance external flux return path for the solenoid coils, the pole pieces of the valves being in substantial contact with the rear web and a relatively small "air" gap at the front end of the coil extending radially from the armature to the edges of the U-shaped recesses in the front web of the bracket.

While various embodiments of the invention have been described in detail, it will be apparent to those skilled in the art the disclosed embodiments may be modified. Therefore, the foregoing description is to be considered exemplary rather than limiting, and the true scope of the invention is that defined in the following claims:

We claim:

1. A multiple solenoid valve module comprising an elongate manifold having a longitudinal axis and internal fluid passage means, a plurality of like generally cylindrical solenoid actuated valve assemblies, each of said valve assemblies including a solenoid coil having a front and a rear end and an armature mounted within the coil for forward and rearward movement coaxially of the coil between a pole piece at the rearward end of the coil and valve seat means spaced forwardly of the front end of said coil, said armature having valve head means thereon movable within said armature into and out of seated engagement with said valve seat means in response to energization and deenergization of the coil the forward ends of said valve assemblies integrally mounted at uniformly spaced positions along said manifold with the axes of the respective coils extending in spaced parallel relationship to each other normal to said longitudinal axis and said valve seat means in fluid flow controlling communication with said passage means in said manifold, a one piece metal mounting bracket having a base and front and rear webs projecting upwardly from said base in spaced opposed parallel relationship, and interlocking means comprising means defining a plurality of like upwardly opening U-shaped recesses in said front web and means defining a complementary groove extending circumferentially of each of said valve assemblies between said manifold and said coils interlocked with each other to seat the forward ends of said valve assemblies in said front web with the forward face of said rear web pressed against the rearward ends of said assemblies to frictionally retain said valve assemblies and said manifold in assembled relationship with said bracket and to establish a low reluctance external flux path through said bracket between the opposite ends of said coils.

2. The invention defined in claim 1 wherein each of said valve assemblies comprises an elongate hollow cylindrical stem integrally joined at its front end to said manifold and having a central passage extending therethrough from its rear end to said valve seat means, said armature being slidably received in said central passage, a connector member secured to the rear end of said coil and having a bore therethrough coaxial of said coil fixedly and sealingly receiving the rear end of said stem, said coil projecting forwardly from said connector member in coaxial relationship with said stem, and means seatingly mounting said pole piece in said central passage.

3. The invention defined in claim 2 further comprising locating means engageable between said connector member and said rear web for fixedly locating said connector member relative to said bracket.

4. The invention defined in claim 2 wherein each of said connector members comprises a body of electrically non-conductive material having said bore extending therethrough from front to rear, an integral flange projecting radially outwardly from said body adjacent the front end of said body, an annular lip on said body projecting forwardly from said flange in coaxial relationship to said bore, the rearward end of said coil being fixedly bonded to the forward side of said flange and to said lip in coaxial relationship to said bore.

5. The invention defined in claim 4 further comprising front and rear flanges integral with each of said stems projecting radially outwardly from the stem at axially spaced locations adjacent the forward end of the stem, the front end of said coil abutting the rearward side of said rear flange and the axial spacing between said front and rear flanges defining the circumferential groove of said interlocking means, said front web of said bracket being snugly received between said front and rear flanges of said stem.

6. The invention defined in claim 4 wherein the rearward end of each pole piece projects rearwardly through the bore in the associated connector member to engage said rear web.

7. The invention defined in claim 1 wherein said bracket is made of sheet metal material and includes a base portion having parallel front and rear edges, said rear web being bent upwardly from said base portion along said rear edge and said front web being bent upwardly from said base portion along said front edge, said front web including a first portion projecting upwardly from said base portion to an upper edge parallel to said front edge and a second portion of said front web bent downwardly along said upper edge into face-to-face engagement with said first portion whereby said front web is defined by a double thickness of said sheet metal material, said U-shaped recesses extending downwardly from said upper edge into both of said first and second portions of said front web.

8. The invention defined in claim 7 wherein said circumferential groove is defined by the space between a pair of axially spaced radially projecting flanges on the valve assembly, the axial spacing between said flanges being such that said front and rear portions of said front web are gripped between said flanges when the valve assembly is seated within a U-shaped recess in said front web.

9. A multiple solenoid valve assembly comprising a manifold, a plurality of tubular solenoid coil supporting stems integrally joined at their forward ends to said manifold and projecting axially rearwardly from said manifold in spaced parallel relationship to each other, a radially projecting flange fixedly located on each stem adjacent the forward end of the stem, a connector mounted on the rearward end of each stem, a solenoid coil coaxially received on each stem with the forward end of the coil engaged with the rearward side of the flange on the stem and the rearward end of the coil engaged by the forward side of the connector on the stem, and a metal mounting bracket having a rear web commonly engaged with the rearward sides of the respective connectors on the stems and a front web commonly engaged with the front sides of the respective flanges on the stems and defining an external flux return path for all of the solenoid coils mounted on the stems.

10. The invention defined in claim 9 further comprises interlocking means engageable between said rear web and said connectors for locking said connectors against movement laterally of said rear web.

11. The invention defined in claim 9 further comprising complementary interengageable interlocking means on said connectors for interlocking said connectors to each other against lateral movement relative to each other.

12. The invention defined in claim 11 wherein said interengageable interlocking means comprises means defining an undercut recess in one side of each connector and a complementary projection on the opposite side of the connector, the projection on one connector being slidably insertable into the recess of a second connector by moving said one connector forwardly relative to said second connector.

* * * * *